(12) United States Patent
Takada et al.

(10) Patent No.: US 6,768,562 B1
(45) Date of Patent: Jul. 27, 2004

(54) CORRECTING METHOD OF LIGHT BEAM POSITION IN LIGHT BEAM SCANNING APPARATUS

(75) Inventors: Norihisa Takada, Kanagawa (JP); Takeshi Fujii, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/556,478

(22) Filed: Apr. 21, 2000

(30) Foreign Application Priority Data

Apr. 21, 1999 (JP) .......................................... 11-113744

(51) Int. Cl.[7] .......................... H04N 1/04; G02B 26/08; G11B 7/00
(52) U.S. Cl. ...................... 358/296; 358/493; 358/459; 369/44.11; 369/44.12; 359/204
(58) Field of Search ................................ 358/493, 489, 358/296; 369/44.11, 44.12, 44.28, 44.17, 47.18, 47.15, 47.16, 112.01; 346/107.1; 359/196, 210, 204, 211

(56) References Cited

U.S. PATENT DOCUMENTS

| | | | |
|---|---|---|---|
| 4,462,095 A | * | 7/1984 | Chen ........................ 369/44.13 |
| 4,853,919 A | | 8/1989 | Miyawaki et al. ............. 369/46 |
| 4,969,137 A | * | 11/1990 | Sugiyama et al. ........ 369/44.11 |
| 5,305,023 A | | 4/1994 | Fukushige et al. .......... 346/108 |
| 5,502,709 A | * | 3/1996 | Shinada ...................... 369/119 |
| 6,449,225 B1 | * | 9/2002 | Alon ....................... 369/44.17 |

FOREIGN PATENT DOCUMENTS

EP         0 840 493 A2     5/1998          H04N/1/06

* cited by examiner

Primary Examiner—Edward Coles
Assistant Examiner—Jason Sherrill
(74) Attorney, Agent, or Firm—Sughrue Mion, PLLC (57) ABSTRACT

A method for correcting recording positions of light beams scanned by a light beam scanning apparatus, in which at least one of plural light beams is deflected by an optical deflecting device and all the plural light beams are combined and scanned by a common scanning optical system. The beam position correction data for the optical deflecting device for keeping positions of the light beams constant is obtained by detecting the beam positions before the scanning optical system. The recording positions of respective light beams on a recording surface is also detected to obtain an additional correction data for correcting deviations of the recording positions due to uneven optical power distribution of the light beam or astigmatism of the scanning optical system. The additional correction data is added to the beam position correction data to obtain the final correction data, by which the optical deflecting device is controlled.

23 Claims, 10 Drawing Sheets

CONTENT OF FIRST MEMORY

| fa |
|---|
| fb |
| fc |

Fig. 6B

CONTENT OF SECOND MEMORY

| foa (96) |
|---|
| fob (96) |
| foc (96) |
| foa (72) |
| fob (72) |
| foc (72) |
| . . . |
| foa (N) |
| fob (N) |
| foc (N) |
| . . . |

CORRECTING METHOD OF LIGHT BEAM POSITION IN LIGHT BEAM SCANNING APPARATUS

FIELD OF THE INVENTION

The present invention relates to an apparatus for scanning a plurality of combined light beams by using a common scanning optical system and its correcting method.

BACKGROUND OF THE INVENTION

There has been known a light beam scanning apparatus for scanning a plurality of light beams such as laser beams on a recording sheet put on an exposure plane by using a common scanning optical system to record an image on the recording sheet. By using a plurality of light beams, an image can be recorded at a high speed (for example, U.S. Pat. No. 5,502,709).

All of the plurality of light beams or at least light beams other than a basic or reference beam are deflected by individual optical deflecting devices independently to be controlled so that scanning lines formed by respective light beams are put in straight lines at regular intervals on a recording sheet. Since the light beams pass through a common scanning optical system simultaneously, an effect of deterioration with age of the scanning optical system is on a level for all the light beams and therefore it does not matter in general.

Prior to combining respective light beams in combining optical systems, however, the optical systems emitting the light beams are discrete and therefore deterioration with age of these optical systems directly affects positions between the light beams. Light beam intervals or phases on scanning lines fluctuate according to, for example, a temperature change or deterioration with age of the optical systems of respective light beams. It causes a problem that a quality of a recorded image is lowered.

Therefore, light beams are split by a beam splitter and the split light beams are guided to a beam position detecting device to detect respective positions of the light beams. For example, the positions of the light beams are detected, before they enter the scanning optical system, by a 4-split light beam detecting device, a PSD (position sensing device, two-dimensional position sensor) or the like which is positioned on a conjugate plane optically conjugate with an exposure plane or in a position slightly displaced from the conjugate plane. On the basis of a result of the detection, the deflections by the optical deflecting devices are corrected so that the relative positions of the light beams are appropriate.

Figure 9A:
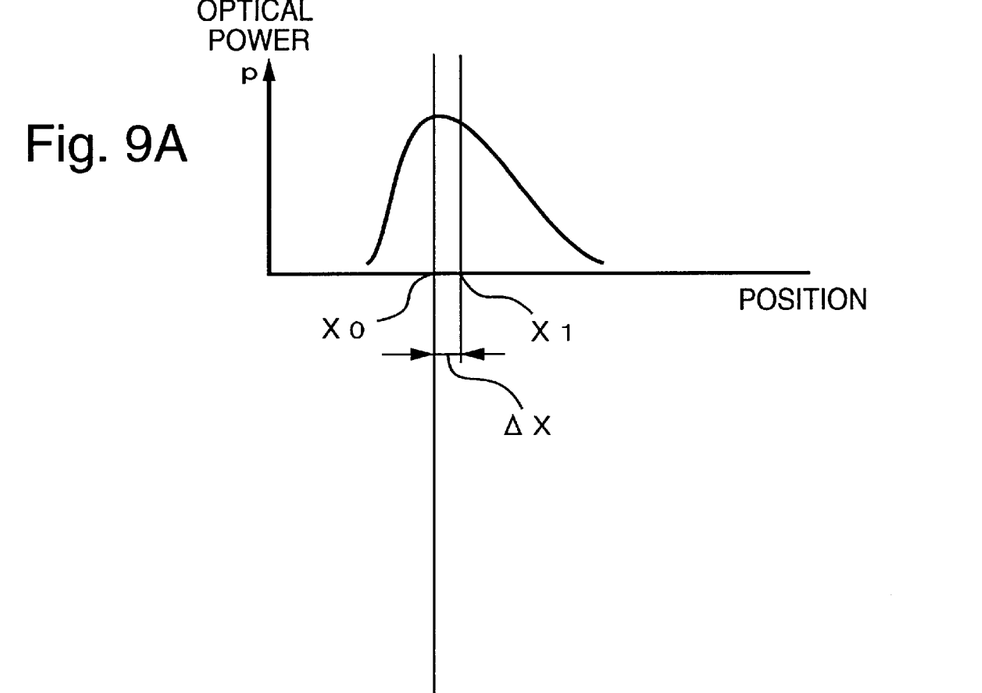
FIGS. 9A and 9B are diagrams of assistance in explaining problems caused by unevenness of an optical power distribution of light beams, by explaining a cause of a disagreement between a recording position on an exposure plane after a beam passes through the scanning optical system and a beam position before the beam impinges on the scanning optical system detected by the beam position detecting device.
Figure 9B:
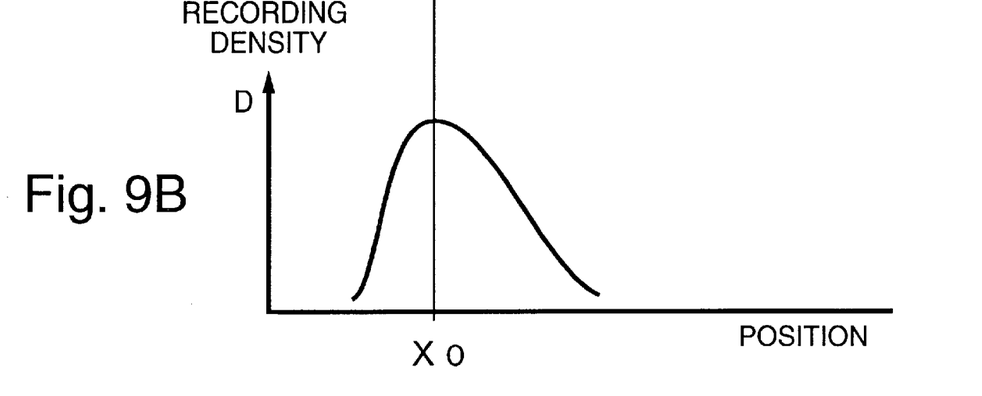

The light beams, however, frequently show an optical power distribution which is not uniform in a circumferential direction within a range of its diameter. Accordingly it has been found that a recording position on the exposure plane after passing the scanning optical system sometimes does not precisely match the beam position before impinging on the scanning optical system detected by the beam position detecting device. FIGS. 9A, 9B are diagrams of assistance in explaining the reason why there is caused the disagreement between the recording position on the exposure plane and the beam position detected by the beam position detecting device. FIG. 9A shows an optical power distribution of the light beam, with an abscissa axis (x) indicating a position on a plane perpendicular to the light beam and an ordinate axis (p) indicating an optical power (or radiant power). As shown in this diagram the optical power (p) is unsymmetric around the maximum optical power position ($x_0$).

On the other hand, a 4-split beam detecting device or a PSD is generally used as a beam position detecting device and they are used to detect a center of gravity of an optical power. In other words, in FIG. 9A, a position ($x_1$) between horizontally equal areas enclosed by the distribution curve of the optical power (p) and the abscissa axis is detected as a beam position. A recording density (D) of the light beam on a film on the exposure plane is as shown in FIG. 9B. In this diagram the abscissa axis (x) indicates a position on the exposure plane and the ordinate axis (D) indicates a recording density. This recording density (D) is the highest in the position $x_0$ where the optical power (p) is the maximum.

Therefore, unless the optical power distribution of the light beam is completely symmetric in a radial direction, an error $\Delta x$ occurs between the beam position ($x_1$) detected by the beam position detecting device and the recording position ($x_0$) on the exposure plane (recording surface). This positional error $\Delta x$ always occurs between a plurality of light beams and therefore it causes deterioration of an output image quality.

To output an image having a high resolution, it is required to expand a beam diameter of a light beam before narrowing the beam to be focused on the exposure plane. To expand the beam diameter, a lens having a large aperture or a mirror is required, while these members easily cause significant astigmatism due to a restriction on manufacturing. On the other hand, to detect the beam position of the light beam, the light beam is split before impinging on an beam expander and is introduced to the beam position detecting device. The split light beam has a small diameter and therefore astigmatism of this light beam is small. It will be described in detail below by using FIGS. 10A–10C.

Figure 10A:
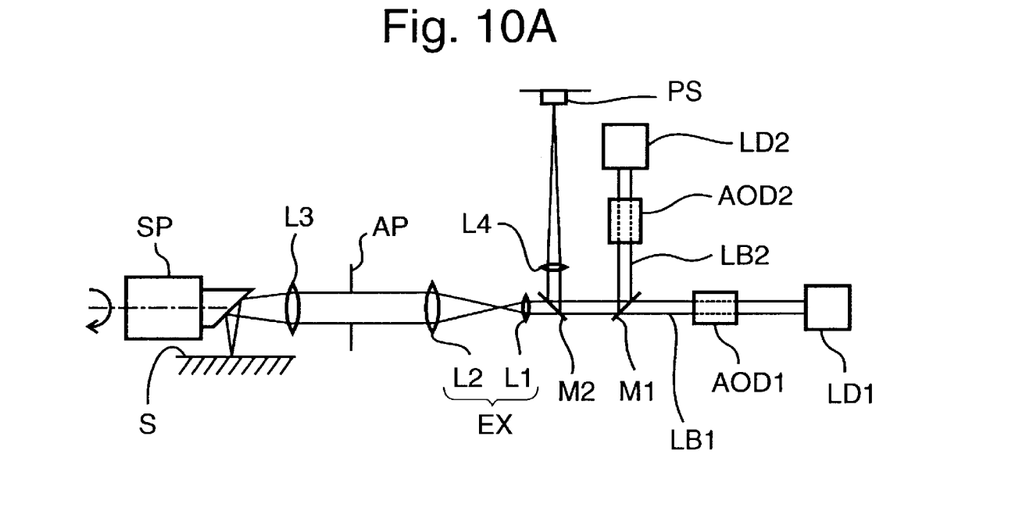
FIGS. 10A to 10C are diagrams of assistance in explaining problems caused by astigmatism of a condenser lens in a conventional light beam scanning apparatus of a drum inner surface scanning type.

FIG. 10A shows an example of a constitution of a light beam scanning apparatus of a drum inner surface scanning type. In this figure, two light beams $LB_1$ and $LB_2$ composed of lasers are combined with each other. These two light beams $LB_1$, and $LB_2$ are emitted from laser diodes $LD_1$ and $LD_2$ and then deflected by acousto-optic deflecting devices $AOD_1$, and $AOD_2$, respectively. These light beams $LB_1$, and $LB_2$ have sufficiently small diameters. These light beams $LB_1$, and $LB_2$ having small diameters are combined by a combining mirror $M_1$ and expanded in their diameters by a beam expander EX formed by lenses $L_1$ and $L_2$.

The expanded light beams pass through an aperture AP, guided to a condenser or focusing lens $L_3$, and then guided to an exposure plane S by a spinner SP. The spinner SP has a mirror rotating at a high speed coaxially with the expander EX and the condenser lens $L_3$. The exposure plane S is formed on an inner surface of the drum coaxial with the spinner SP and relatively moves in a rotary axis extending direction of the spinner SP synchronously with a rotation of the spinner SP.

Figure 10B:
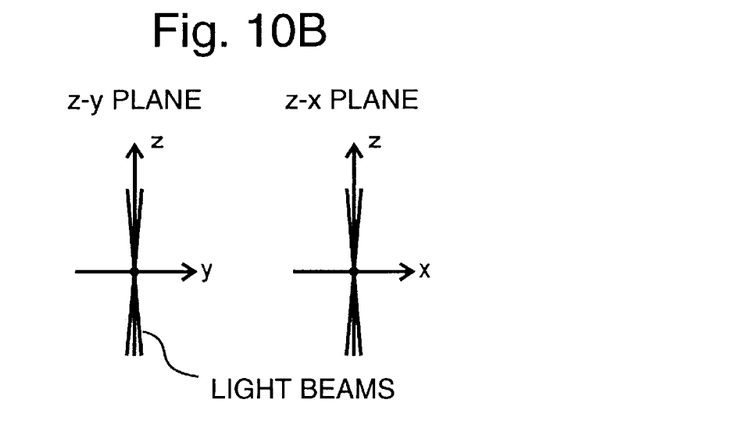

In such a scanning apparatus, the light beams $LB_1$ and $LB_2$ having small diameters before impinging on the expander EX are split by the splitting mirror $M_2$ and then pass through the condenser lens or image focusing lens $L_4$ so as to be guided to the beam position detecting device PS. Therefore, a lens having a small diameter can be sufficiently used as the condenser lens L4 and its astigmatism can be also small. FIG. 10B shows an enlarged diagram of an image formation in this beam position detecting device PS. As apparent from FIG. 10B, a difference between focal positions (astigmatism) is almost zero at a view in two directions perpendicular to each other (x and y directions) on the image focusing plane. An axial z indicates a light beam traveling direction in FIG. 10B.

Figure 10C:
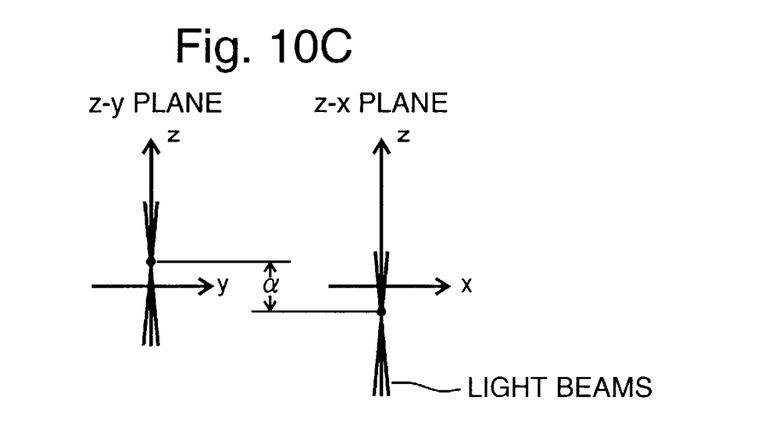

On the other hand, FIG. 10C shows an enlarged diagram of the image formation on the exposure plane S. As shown in FIG. 10C, there is increased a difference (astigmatism) α between a focal position on a z-y plane viewed in the x direction and a focal position on a z-x plane viewed in the y direction. This is because the aperture of the condenser lens $L_3$ is large as mentioned above.

In this manner if there is an error Δx caused by an unsymmetric optical power distribution of the light beam described by referring to FIG. 9 or an error caused by astigmatism μ described by referring to FIG. 10, an image quality for recording is reduced. Particularly in an image setter for printing requiring a high-precision image recording, there sometimes appear moire stripes generated by a slight density change which may periodically occur on the image combined with dots. Therefore, it has a problem that an image quality may be deteriorated.

SUMMARY OF THE INVENTION

The present invention has been accomplished under the circumstances as aforementioned, and a first object thereof is to provide a correcting method for a light beam scanning apparatus capable of preventing a positional relationship of a plurality of light beams from fluctuating according to a temperature change or deterioration with age of an optical system before a scanning optical system and of preventing an image quality from being reduced by unevenness of optical power within a diameter of a light beam or by astigmatism of an optical system. It is a second object of the present invention to provide a light beam scanning apparatus directly used for an embodiment of this method.

The first object of the present invention is achieved by a method for correcting a recording position of a light beam recorded on an exposure plane by a light beam scanning apparatus, in which at least one light beam of a plurality of light beams is deflected by an optical deflecting device and said plurality of light beams including the deflected light beam are combined and scanned by a common scanning optical system to said exposure plane, comprising:

detecting respective positions of said plurality of light beams before the scanning optical system by using a beam position detecting device;

determining a first correction data for optical deflecting devices for keeping said detected relative beam positions of the respective light beams constant and storing said first correction data;

detecting the recording position of the light beam on said exposure plane to determine a deviation of the recording position from an optimum position, and obtaining a second correction data for correcting said deviation; and adding said second correction data to said first correction data to obtain final correction data for driving said optical deflecting device.

When the scanning optical system is of a drum inner surface scanning type and one of the introduced light beams is a central beam coaxial with a rotary axis of the scanning optical system, this central beam (basic beam) may be guided to the scanning optical system bypassing the optical deflecting device. Optical deflecting devices are provided for light beams other than the basic (central) beam. Unless this central beam is used, respective optical deflecting devices may be provided for all the light beams so that all the light beams are deflected.

The first correction data (which is also referred to as "beam position correction data", in the specification) may be stored in a first memory area. The second correction data (which is also referred to as "recording position correction data" or "additional correction data", in the specification) may include a plurality of types of recording position correction data correspondingly to resolutions on the light beam exposure plane, which are previously obtained. Such second correction data may be stored in a second memory area. With such a constitution, the second correction data corresponding to required output resolutions can be selected out of the second memory area and combined with the first correction data in the first memory area to obtain the final correction data.

A common memory of the first and second memory areas can be divided into a plurality of memory areas and different memory areas be prepared as first and second memory areas, respectively. The first and second memory areas can be configured by separate memory devices.

The second correction data (recording position correction data) can be obtained as described below. After controlling respective optical deflecting devices by using data of the beam position detecting device so as to match the respective beam positions before an introduction to the scanning optical system, it is checked that there is a difference in the recording positions of the respective light beam where an image is actually output to the exposure plane. If the difference is found, a compensation quantity is obtained for controlling a deflection quantity (angle) of an optical deflecting device to compensate this difference. This compensation quantity of the deflection quantity is considered as recording position correction data, i.e., the second correction data.

The recording position correction data can also be obtained by measuring intervals between record lines formed by a plurality of light beams onto the exposure plane and making settings so as to keep these line intervals constant. These intervals can be measured by visual observation using a magnifying lens and a measuring gauge. A plurality of types of this recording position correction data can be previously stored in the second memory area according to predetermined or desired resolutions of the image to be recorded.

The second object of the present invention is achieved by a light beam scanning apparatus for scanning a plurality of combined light beams by using a common scanning optical system, comprising:

an optical deflecting device for deflecting at least one of a plurality of light beams;

a combining optical system for combining all the light beams including the deflected light beams;

a scanning optical system for guiding the combined light beams to an exposure plane for scanning and recording an image;

a beam splitter for splitting said combined light beams;

a beam position detecting device for detecting beam positions of respective light beams in the split combined beams;

a first processing means for comparing data of a plurality of beam positions detected by the beam position detecting device with previously stored initial data and calculating a difference between both data as a first correction data;

a first memory area for storing said first correction data;

a second memory area for storing a second correction data for use in correcting relative position differences of the recording positions, the second correction data being determined on the basis of the recording positions of the respective light beams recorded on the light beam exposure plane;

a second processing means for calculating final correction data for said optical deflecting device on the basis of said first correction data and said second correction data; and optical deflecting device control means for controlling a deflection caused by said optical deflecting device on the basis of the final correction data in synchronization with said scanning optical system.

A two-dimensional position sensor may be used for the beam position detecting device. The light beam may be a laser beam emitted from a laser diode or a solid-state laser. The scanning optical system may be of a drum inner surface scanning type. In this case, optical deflecting devices capable of two-dimensionally deflecting beams is suitable. It is possible to use, for example, two-dimensional acousto-optic deflecting devices or to combine two one-dimensional acousto-optic deflecting devices perpendicularly to each other in the above use. In addition, for the optical deflecting devices, electro-optic deflecting devices may be used instead of acousto-optic deflecting devices.

The second correction data stored in the second memory may include a plurality of types of recording position correction data, each corresponding to output resolutions and any selected recording position correction data may be used as the second correction data. Preferably, a content of the first memory area are rewritten by a rewrite instruction signal appropriately entered. A rewrite instruction for the first memory area may be sent out at power-on, once every certain elapsed time, once every image output by a certain number of pages, or a time when an operator desires.

The light beam scanning apparatus previously stores optimum relative position information of respective light beams as initialization data. First, a beam position of each light beam is detected by the beam position detecting device and then the data is obtained so as to obtain a difference from the initialization data and the difference is considered as beam position correction data. This beam position correction data is stored as first correction data in the first memory area. This correction data is stored individually in the same manner for all the light beams. In the second memory area, only correction data corresponding to output resolutions are stored as additional or second correction data, first.

If one of the plurality of light beams is considered as a basic beam and only other light beams are deflected by using the optical deflecting devices, an adjustment is required to be previously performed so that the basic beam is registered on an optical axis of the scanning optical system. In addition for other light beams, the beam position correction data is stored as described above.

Subsequently the final correction data is obtained by using the first correction data which is the content of the first memory area and the second correction data (correction data corresponding to output resolutions) which is the content of the second memory area, and light beams are scanned while correcting a deflecting quantity of the optical deflecting devices for the light beams. Specifically, the optical deflecting devices are driven so as to provide a predetermined deflection corresponding to an output resolution, by which relative beam positions of the light beams are controlled appropriately, so that the scanning line intervals correspond to output resolutions. In this manner, combined beams in which relative positions are kept appropriately are scanned by using a common scanning optical system for a scan on a recording sheet.

Scanning output lines formed with the light beams recorded on the exposure plane are observed to be checked whether there is uneven line intervals. If this unevenness is found, correction data for compensating it, in other words, data for correcting the relative position differences of the recording positions is determined and added to the data corresponding to the output resolutions so as to obtain the second correction data. The thus obtained data is stored in the second memory area. Alternatively, the second correction data is obtained by controlling respective optical deflecting devices so as to make light beams coincident on the beam position detecting device. In this case, recording position differences of the light beams on the exposure plane are observed to determine compensation quantity of the deflection of the respective optical deflecting device so as to compensate the observed difference. Such compensation quantity may be used as the second correction data.

The second processing means are used to obtain the final correction data by combining the beam position correction data (first correction data) stored in the first memory area with the recording position correction data (second correction data) stored in the second memory area. The optical deflecting device control means is used to drive the optical deflecting devices by using the final correction data. Therefore, uneven output line intervals formed with the plurality of light beams are corrected, thereby an image quality is improved.

DETAILED DESCRIPTION OF THE PREFERRED EMBODIMENTS

First Embodiment

A light beam scanning apparatus of a drum inner surface scanning type according to a first embodiment of the present invention will be described hereinafter, by referring to FIGS. 1 to 6.

In FIGS. 1 to 4, three laser diodes 10 (10a, 10b, 10c) as light beam output means output laser beams L ($L_a$, $L_b$, $L_c$) each having almost the same wave length and strength. These laser beams $L_a$, $L_b$, and $L_c$, are combined by a combining optical system 12 via optical systems which are not shown and via two-dimensional acousto-optic deflecting devices AOD ($AOD_a$, $AOD_b$, $AOD_c$) as optical deflecting devices.

Figure 1:
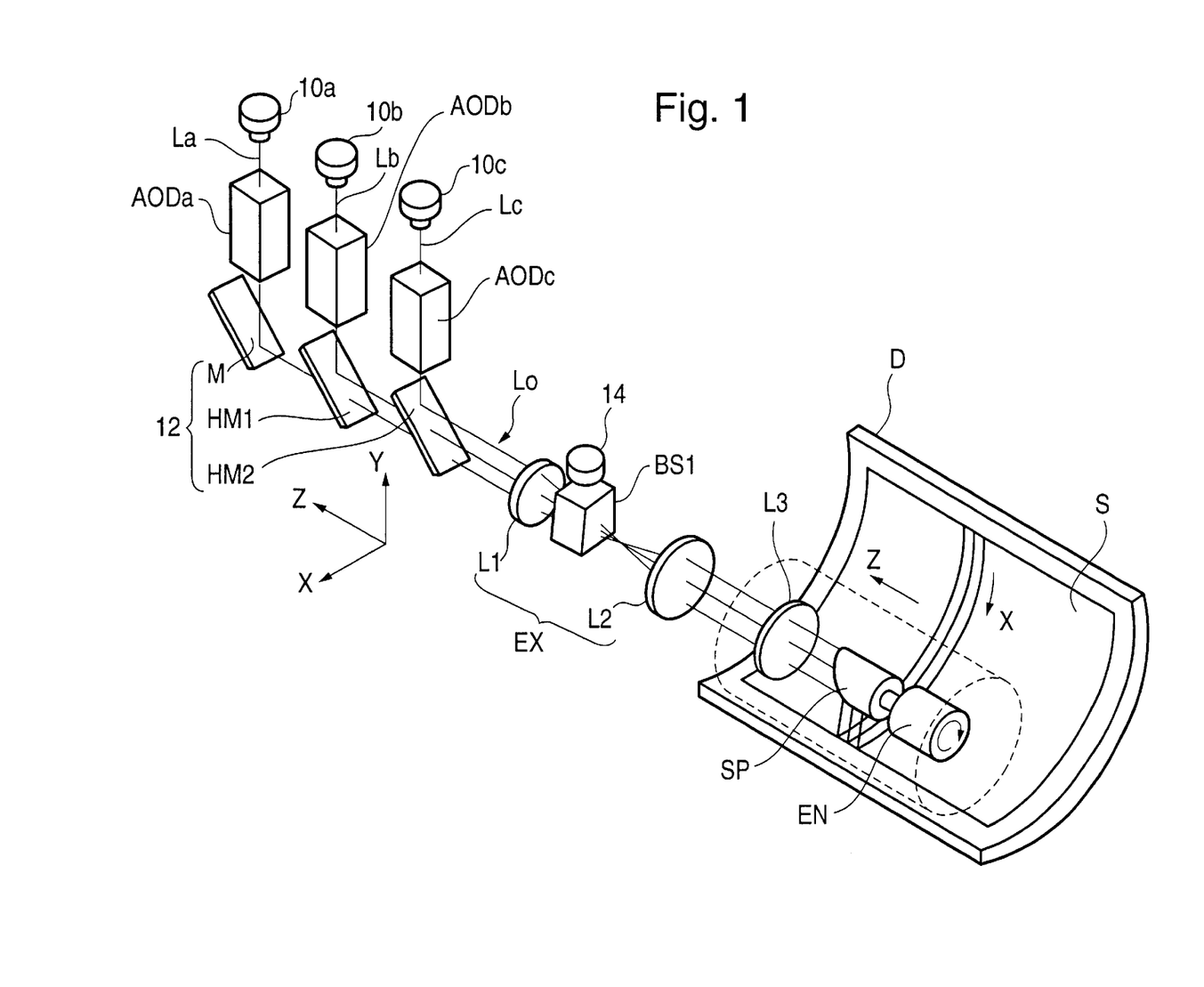
FIG. 1 is a perspective view showing a drum inner surface scanning apparatus according to a first embodiment of the present invention.

The AODs are, as described later, driven by ultrasonic waves having a predetermined frequency generated by transducers, respectively. An incident light beam is diffracted with a standing wave produced by the ultrasonic wave. The primary diffracted light is selected by a zero-dimensional light cutting plate (not shown). By varying the frequency of a drive signal of the AOMs, the diffraction angle of the light beam is slightly changed. The drive signal is modulated by a binary image signal. If a binary image signal is off, outputs of the laser diodes 10 are off.

Three AODs are used to deflect laser beams $L_a$, $L_b$, and $L_c$, in the x-axis direction and in the y-axis direction on the two-dimensional basis in this embodiment, respectively. In other words, the laser beams L are deflected in two directions perpendicular to each other (in the x-axis direction and in the y-axis direction) to correct bends, intervals, and lengths of the main scanning lines.

The combining optical system 12 is formed by a total reflection mirror M and half mirrors $HM_1$, and $HM_2$.

The laser beams $L_a$, $L_b$, and $L_c$ are combined to almost a single laser beam, i.e., a combined beam $L_0$ by this combining optical system 12. Although this combined beam $L_0$ is shown as a single. beam in FIGS. 2. to 4, actually it is split to three non-coaxial beams as shown in FIG. 1 due to component errors or adjustment errors of the combining optical system 12.

The beam diameter of the combined beam $L_0$ is enlarged or changed by the lenses $L_1$, and $L_2$ constituting the beam expander EX. This beam $L_0$ is guided to an inside of a cylindrical drum D along a central axis thereof. On the central axis of the drum D, there are provided a condenser lens $L_3$ and a spinner SP which constitutes a scanning optical system.

The spinner SP has a reflective surface with an angle of 45° relative to the central axis (rotary axis), and is rotated by a motor at a high speed. A rotary encoder EN is mounted on this motor to detect the rotation angle ($\theta = \omega t$) of the spinner SP. Specifically, a pulse signal p is output at every predetermined rotation angle, and a reference position signal $P_0$ indicating a reference position of a single turn is also output. The light beam $L_0$ guided to this spinner SP passes through the beam expander EX and the condenser lens $L_3$ on the rotation axis, and is focused on the inner peripheral surface of the drum D or on a recording sheet S held on the inner surface of the drum D.

Figure 2:
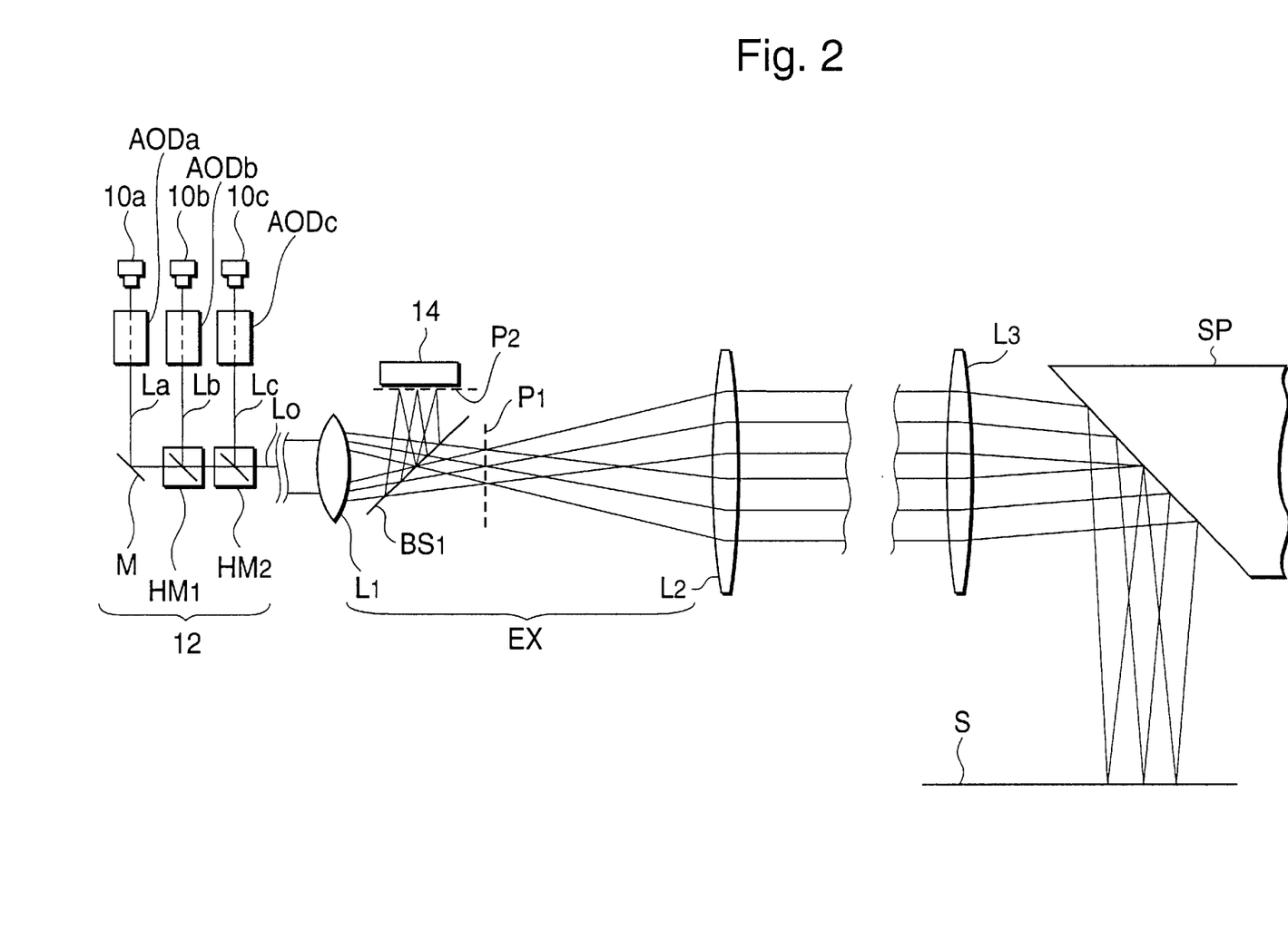
FIG. 2 is an explanatory diagram for a beam splitter for a use in the light beam scanning apparatus in FIG. 1.

A beam splitter $BS_1$, is provided within the arrangement of the beam expander EX. The beam splitter $BS_1$, splits a part of the combined beam $L_0$ and forms an image on a focal plane $P_2$ which is conjugate with the focal plane $P_1$ of the lens $L_1$. On the focal plane $P_2$ or a position slightly deviated therefrom, there is provided a two-dimensional PSD (two-dimensional position sensor) 14 as a beam position detecting device to detect beam positions of the light beams $L_a$, $L_b$, and $L_c$.

Figure 3:
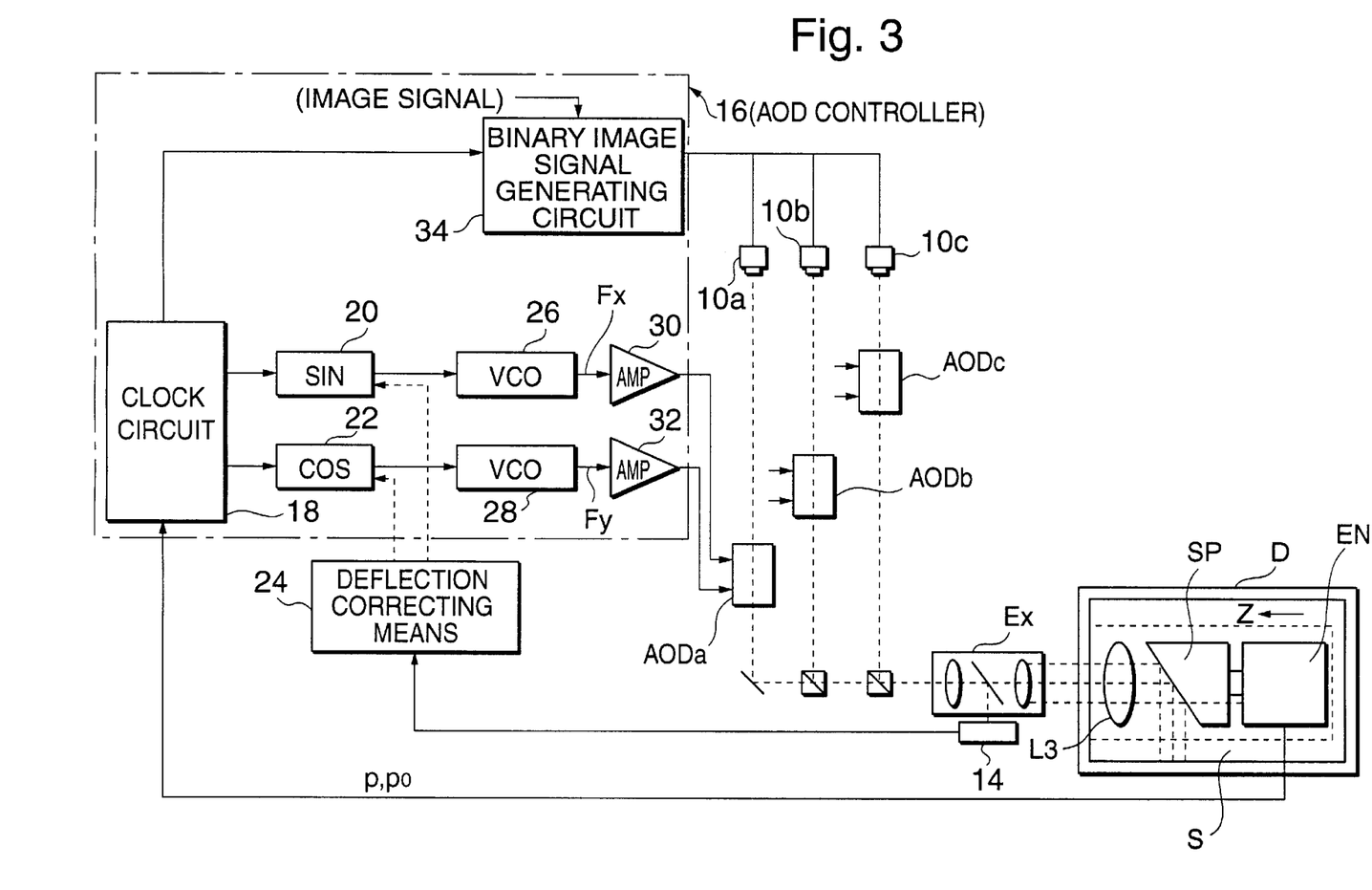
FIG. 3 is a circuit constitution of control means for an optical deflecting device (AOD) of the light beam scanning apparatus in FIG. 1.
Figure 4:
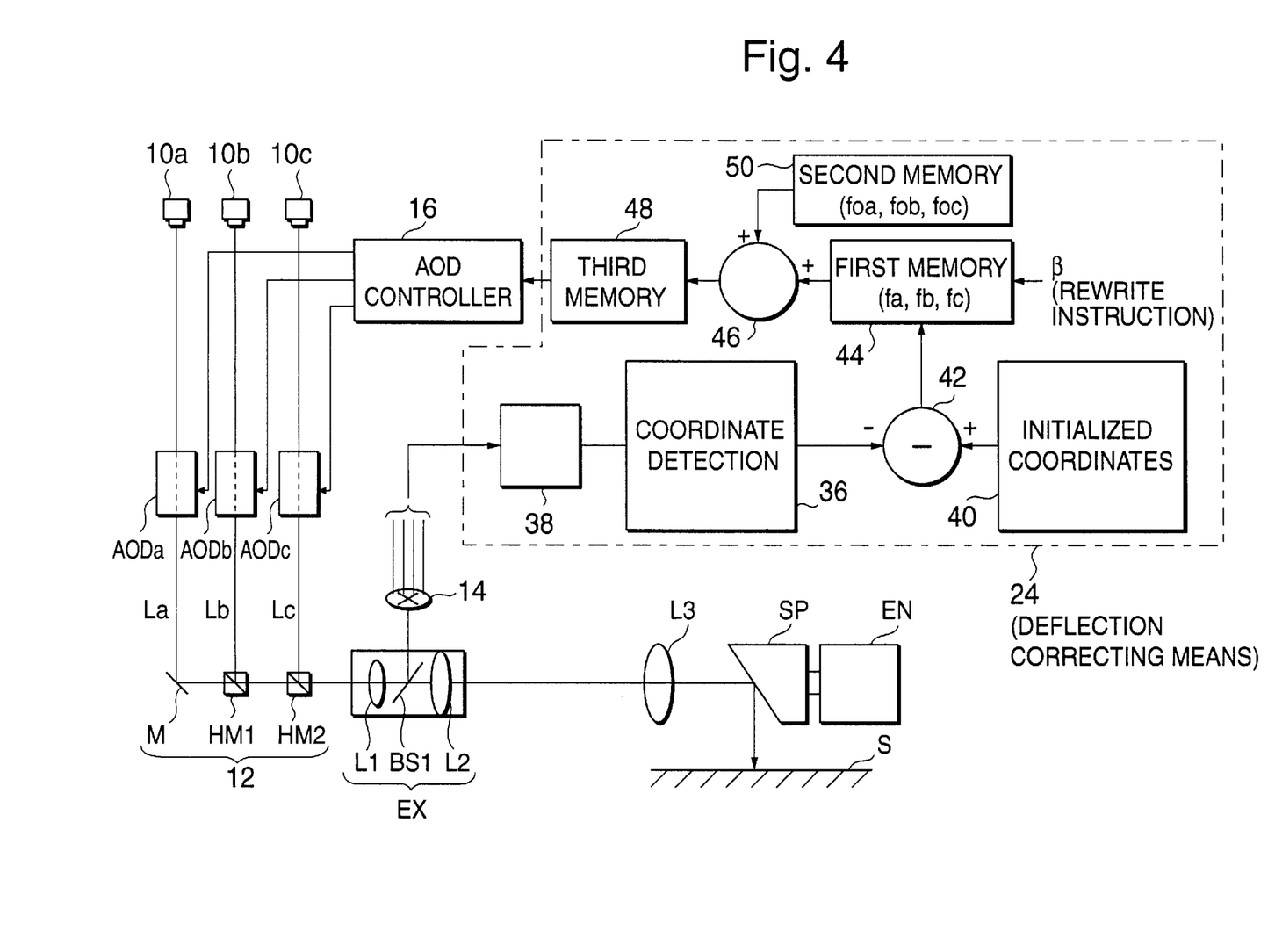
FIG. 4 is deflecting correction means for a use in the light beam scanning apparatus in FIG. 1.

In FIG. 4, a reference numeral 16 designates AOD controller as an optical deflecting device control means, which control AODs in synchronization with a rotation angle θ of the spinner SP. Referring to FIG. 3, there is shown a circuit constitutional example of AOD controller 16. FIG. 3 shows a driving circuit only for a single $AOD_a$ to simplify the description, while actually the same circuits as the circuit shown in this diagram are arranged for other $AOD_b$ and $AOD_c$, respectively.

In FIG. 3, a clock circuit 18 outputs control clock signals on the basis of the pulse signal p and the reference position signal $p_0$. The pulse signal p is output from the encoder EN at every constant rotation angle of the spinner SP. Reference numerals 20 and 22 designate a sine-wave signal generating circuit and a cosine-wave signal generating circuit, respectively.

These sine-wave signal generating circuit 20 and the cosine-wave signal generating circuit 22 output deflection data in the x direction and in the y direction, respectively. The deflection data is added to an AOD driving frequency to deviate the laser beam L in the x-axis direction and in the y-axis direction so as to correct bends, intervals, and lengths of the main scanning lines.

Correction data is output from deflection correcting means 24 and transferred to these sine-wave signal generating circuit 20 and the cosine-wave signal generating circuit 22. Outputs from these circuits 20 and 22 are corrected on the basis of this correction data, which results in resolving the relativel position differences among light beams $L_a$, $L_b$, and $L_c$ caused by a temperature change or deterioration with age of the optical system.

The sine-wave generating circuit 20 and the cosine-wave generating circuit 22 output sine wave voltage signal (sin) and cosine wave voltage signal (Cos) each having a predetermined amplitude and phase, in synchronism with a rotation angle of the spinner SP, i.e., a clock signal output from the clock circuit 18. On the other hand, the deflection correcting means 24 generally output correction data for correcting amplitudes or phases of these sine waves and the cosine waves. Therefore, this correction data is a constant including a coefficient or factor of the function, in general. The deflection correcting means 24 will be described later.

Voltage-controlled oscillators (VCO) 26 and 28 output frequency modulation signals F ($F_x$, $F_y$). The frequencies of the signals F vary correspondingly to output voltage fluctuations in the sine-wave and cosine-wave generating circuits 20 and 22. These signals F are amplified by amplifiers (AMP) 30 and 32, respectively, and then guided to corresponding AODs, so that light beams are deflected in the x and y directions.

A binary image signal generating circuit 34 outputs a binary image signal for writing three main scanning lines by the three laser beams L, on the basis of an image signal inputted from an image processing circuit which is not shown. These binary image signals are inputted to the laser diodes 10 (10a, 10b, 10c). The laser diodes 10 emit laser beams when the binary image signal is on, and respective AODs deflect the primary diffracted lights of the laser beams L in the x and y directions. As a result, linear three main scanning lines can be recorded at regular intervals on the recording sheet S.

Next, the deflection correcting means 24 will be described below with referring to FIG. 4. An output from the two-dimensional PSD 14 is inputted via the amplifier 38 to a coordinate detecting circuit 36. The coordinate detecting circuit 36 detects a position of a light beam by comparing a plurality of outputs from the two-dimensional PSD 14 with each other. The two-dimensional PSD 14 is arranged on a focal plane $P_2$ (FIG. 2) or in a position slightly deviated from the plane $P_2$, and a luminous flux of light beams impinges on the PSD 14 in an expanded condition to some extent. Therefore, the position of the center of the light beam can be detected by comparing the plurality of outputs from the two-dimensional PSD 14.

A memory area 40 is used for storing initialization data. In this memory area 40, is previously stored data indicating appropriate coordinates of three light beams $L_a$, $L_b$, and $L_c$. Such data is stored as coordinates where the light beams $L_a$, $L_b$, and $L_c$ should be positioned at a certain angular position of the spinner SP, for example. The data can be entered at an initialization of the light beam scanning apparatus.

Figure 6A:
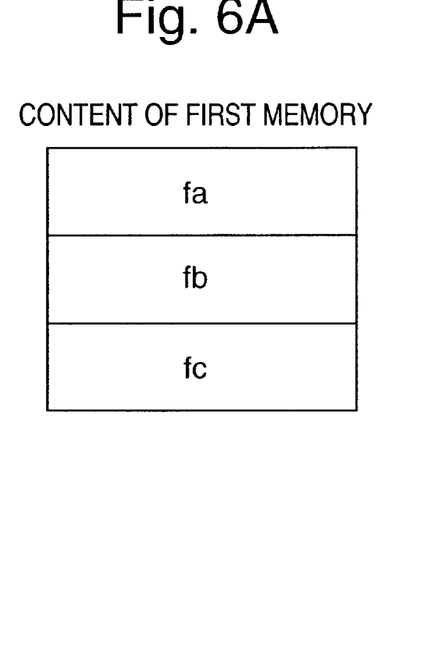
FIGS. 6A and 6B are diagrams of assistance in explaining contents of a first memory area and a second memory area.

First processing means 42 is used to obtain a difference between data indicating a position of the single light beam $L_a$ detected by the two-dimensional PSD 14 and the initialization data stored in the memory area 40. This difference depends upon characteristics of the optical system or of various devices, deterioration with age or a temperature change of the optical system, and thus detected difference is stored in a first memory area 44 as beam position correction data $f_a$. For other light beams $L_b$ and $L_c$, in the same manner the differences, i.e., beam position correction data $f_b$ and $f_c$ are obtained and stored in the first memory area 44. FIG. 6A shows a content of the first memory area 44.

A rewrite instruction signal β instructs the first processing means 42 to start the calculation and rewrites the content of the first memory area 44. While this rewrite instruction β can be appropriately inputted by an operator, it can also be output automatically when a power switch is turned on or at regular intervals. The rewrite instruction β can be output when an image output of a predetermined number of pages is completed.

Second processing means 46 are used to obtain final correction data $(f_a+f_{oa})$, $(f_b+f_{ob})$, and $(f_c+f_{oc})$ by adding additional correction data (recording position correction data) $f_{oa}$, $f_{ob}$, and $f_{oc}$ to the beam position correction data $f_a$, $f_b$, and $f_c$, which is stored in the first memory area 44. The obtained final correction data is stored in a third memory area 48.

The additional or recording position correction data $f_{oa}$, $f_{ob}$, and $f_c$ used here is an addition of (1) correction data corresponding to output resolutions and (2) correction data for correcting an error between a beam recording position recorded on the recording sheet S and a beam position detected by the beam position detecting device 14, in other words, (1)+(2), which is stored in the second memory area 50. The additional correction data $f_{oa}$, $f_{ob}$, and $f_{oc}$ of a plural number of types are stored in the second memory area 50 so as to correspond to plural output resolutions.

Figure 5:
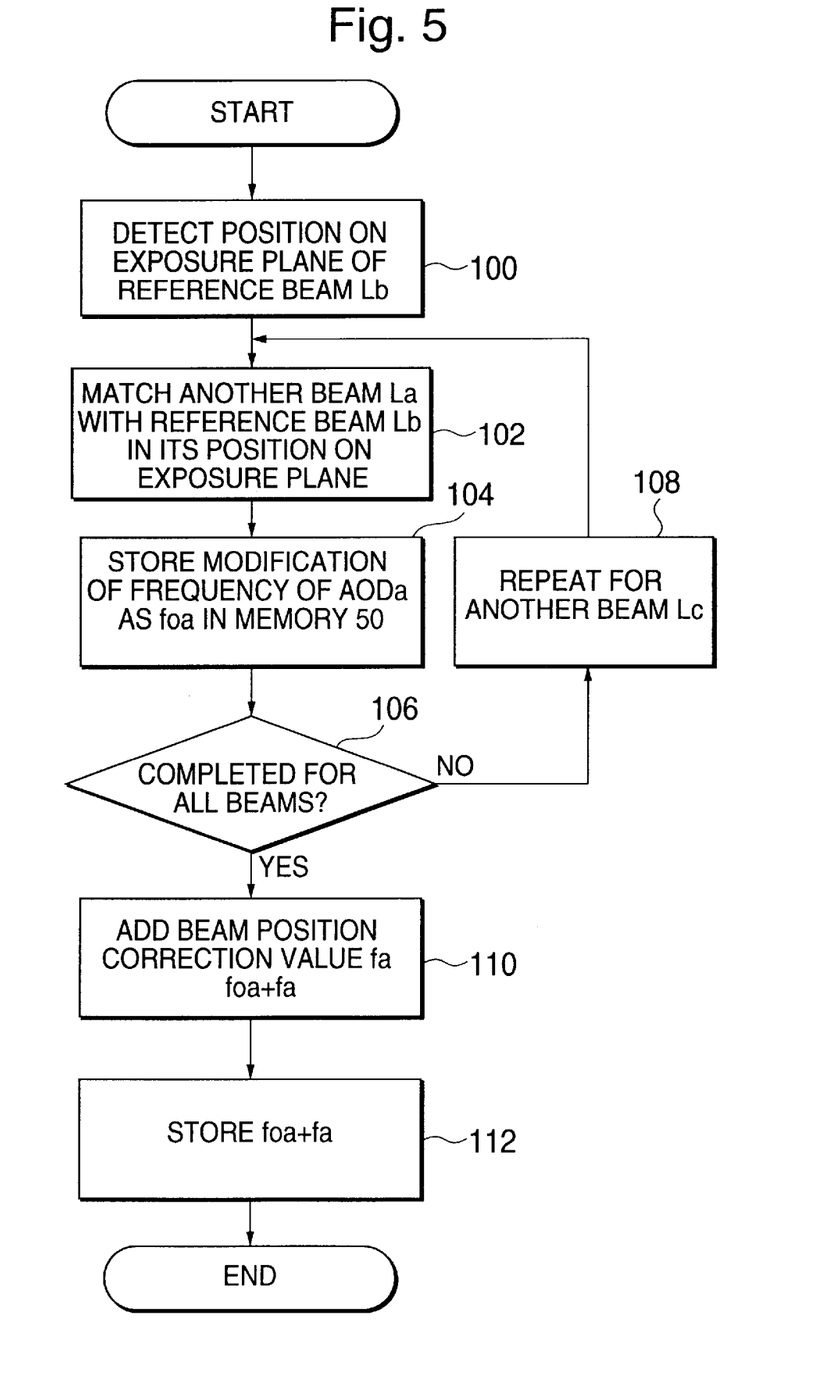
FIG. 5 is a diagram showing a procedure of a correcting method for the light beam scanning apparatus according to the present invention.
Figure 6B:
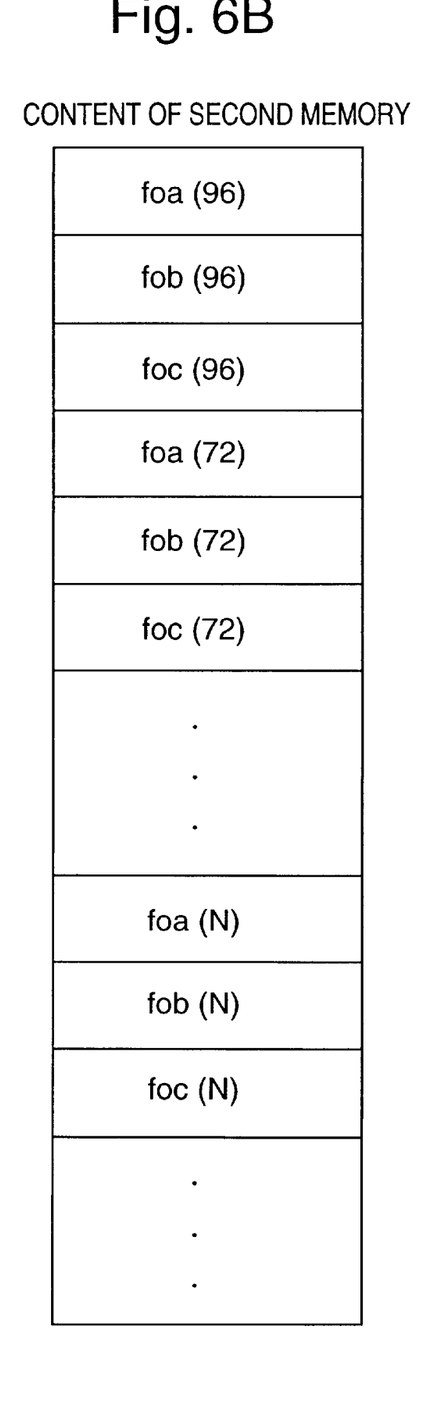

More specifically, as shown in FIG. 6B, the second memory area 50 is used to store data corresponding to output resolution 96 res (the number of scanning lines per mm, equivalent to 2,438 dpi) as $f_{oa}(96)$, $f_{ob}(96)$, and $f_{oc}(96)$, data corresponding to 72 res as $f_{oa}(72)$, $f_{ob}(72)$, and $f_{oc}(72)$, and data corresponding to other output resolutions as $f_{oa}(N)$, $f_{ob}(N)$, and $f_{oc}(N)$. In this description, N indicates an output resolution. This additional correction data $f_{oa}$, $f_{ob}$, and $f_{oc}$ can be obtained in a procedure shown in FIG. 5, for example.

In FIG. 5, $L_b$ is a reference light beam (basic beam). First, only this reference beam $L_b$ is emitted and then a recording position on the exposure plane or on the recording sheet S is detected to consider this position as an origin (Step 100). Next, other light beams $L_a$ is emitted and $AOD_a$ is controlled so that the beam position of the light beam $L_a$ comes to the beam position of the reference beam $L_b$. In other word it is controlled so that initialized coordinates are the same as those of the beam $L_b$.

In this condition, a recording position on the exposure plane of the beam $L_a$ is detected and an $AOD_a$ driving frequency is changed so that the recording position of the beam $L_a$ is coincident with the origin (the above-mentioned recording position of the reference beam $L_b$) on the exposure plane (Step 102). With a reference of this time, a compensation (or modification) quantity of the $AOD_a$ driving frequency needed for the light beam $L_a$ to have line intervals corresponding to the desired output resolution is stored in the second memory area 50 as additional (or recording position) correction data $f_{oa}$ (Step 104). For another beam $L_c$, the same operation is performed (Steps 106 and 108) and the compensation quantity for the beam $L_c$ its correction is stored as additional correction data foc in the second memory area 50 (Steps 102 and 104).

The additional correction data $f_{oa}$, $f_{ob}$, and $f_{oc}$ obtained in this manner is added to the beam position correction data $f_a$, $f_b$, $f_c$ in the second processing means 46, respectively (Step 110), and its result is stored as the final correction data $(f_a+f_{oa})$, $(f_b+f_{ob})$, and $(f_c+f_{oc})$ in the third memory area 48 (Step 112).

In the AOD controller 16, deflection data output from the sine-wave signal generating circuit 20 and the cosine-wave signal generating circuit 22 are corrected on the basis of the final correction data stored in the third memory area 48. In other words, the final correction data is intended for the deflection data. This final correction data is generally a coefficient or factor for correcting amplitudes or phases of the sine wave voltage signal and the cosine wave voltage signal.

Next, an operation of this embodiment is described hereinafter. When the rewrite instruction β is entered, only the single light beam $L_a$ is output to detect its beam position by the two-dimensional PSD 14. Then, the detected beam position is compared with the initialization data corresponding to an angular position of the spinner SP at that time to obtain a difference between them and the difference is stored in the first memory area 44 as the beam position correction data $f_a$. In the same manner for other light beams $L_b$ and $L_c$, respective differences are obtained and stored in the first memory area 44 as the beam position correction data $f_b$ and $f_c$.

In addition, additional (or recording position) correction data $f_{oa}$, $f_{ob}$, and $f_{oc}$ for correcting differences of the recording positions of the beams $L_a$, $L_b$, and $L_c$ on the exposure plane are obtained in the procedure shown in FIG. 5 and then stored in the second memory area 50. Subsequently, by using-the contents of the second memory area 50 and the first memory area 44, the final correction data $(f_a+f_{oa})$ $(f_b+f_{ob})$, and $(f_c+f_{oc})$ are obtained in the second processing means 46 and stored in the third memory area 48.

After a completion of this preparation, laser diodes 10*a*, 10*b*, and 10*c* are turned on or off on the basis of a binary image signal output from the binary image signal generating circuit 34 for a rotation of the spinner SP. The sine-wave generating circuit 20 and the cosine-wave generating circuit 22 of the AOD controller 16 output sine waves and cosine waves corrected on the basis of the contents (the final correction data) of the third memory area 48 and AODs are driven at frequencies corresponding to these sine waves and cosine waves.

As a result, three light beams $L_a$, $L_b$, and $L_c$ are appropriately deflected by respective $AOD_a$, $AOD_b$, and $AOD_c$, by which relative distances or positions are appropriately kept according to the desired output resolutions. In this manner, three light beams $L_a$, $L_b$, and $L_c$ whose relative beam positions are corrected are combined by the combining optical system 12 and guided to the recording sheet S via the beam expander EX and the scanning optical system ($L_3$, SP). Therefore, three scanning lines recorded by three light beams $L_a$, $L_b$, and $L_c$ on the recording sheet can be straight lines parallel to each other with their uniform lengths and phases, by which an image quality of the recorded image can be improved.

Second Embodiment

Figure 7:
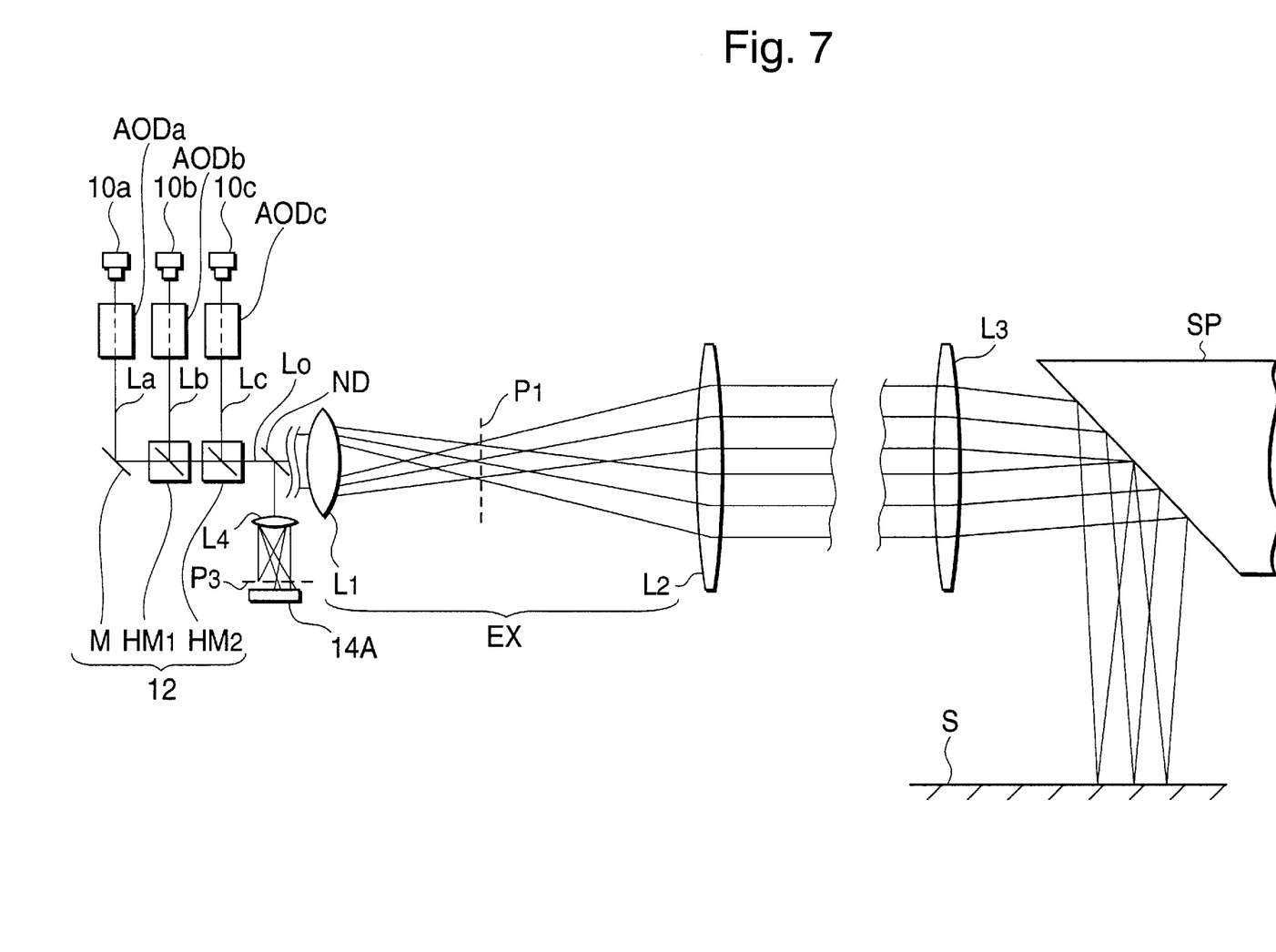
FIG. 7 is a conceptional diagram showing a light beam scanning apparatus of a drum inner surface scanning type according to a second embodiment of the present invention.

Referring to FIG. 7, there is shown a conceptional diagram of a light beam scanning apparatus of a drum inner surface scanning type according to a second embodiment of the present invention. In the embodiment shown in FIGS. 1 to 4, the beam splitter $BS_1$ is arranged in the beam expander EX and a part of the combined beam $L_0$ is split to form two focal planes $P_1$ and $P_2$. As shown in FIG. 7, however, it is also possible to split a part of the combined beam $L_0$ by inserting a density filter ND for adjusting a light intensity, instead of the beam splitter $BS_1$, so as to form an image on a focal plane $P_3$ by using a condenser lens $L_4$. Positions of respective light beams can be detected by a two-dimensional PSD 14A arranged on the focal plane $P_3$ or in the vicinity thereof. In this embodiment, the focal plane $P_3$ is conjugate with the focal plane $P_1$ of a lens $L_1$ of the expander EX.

Third Embodiment

Figure 8:
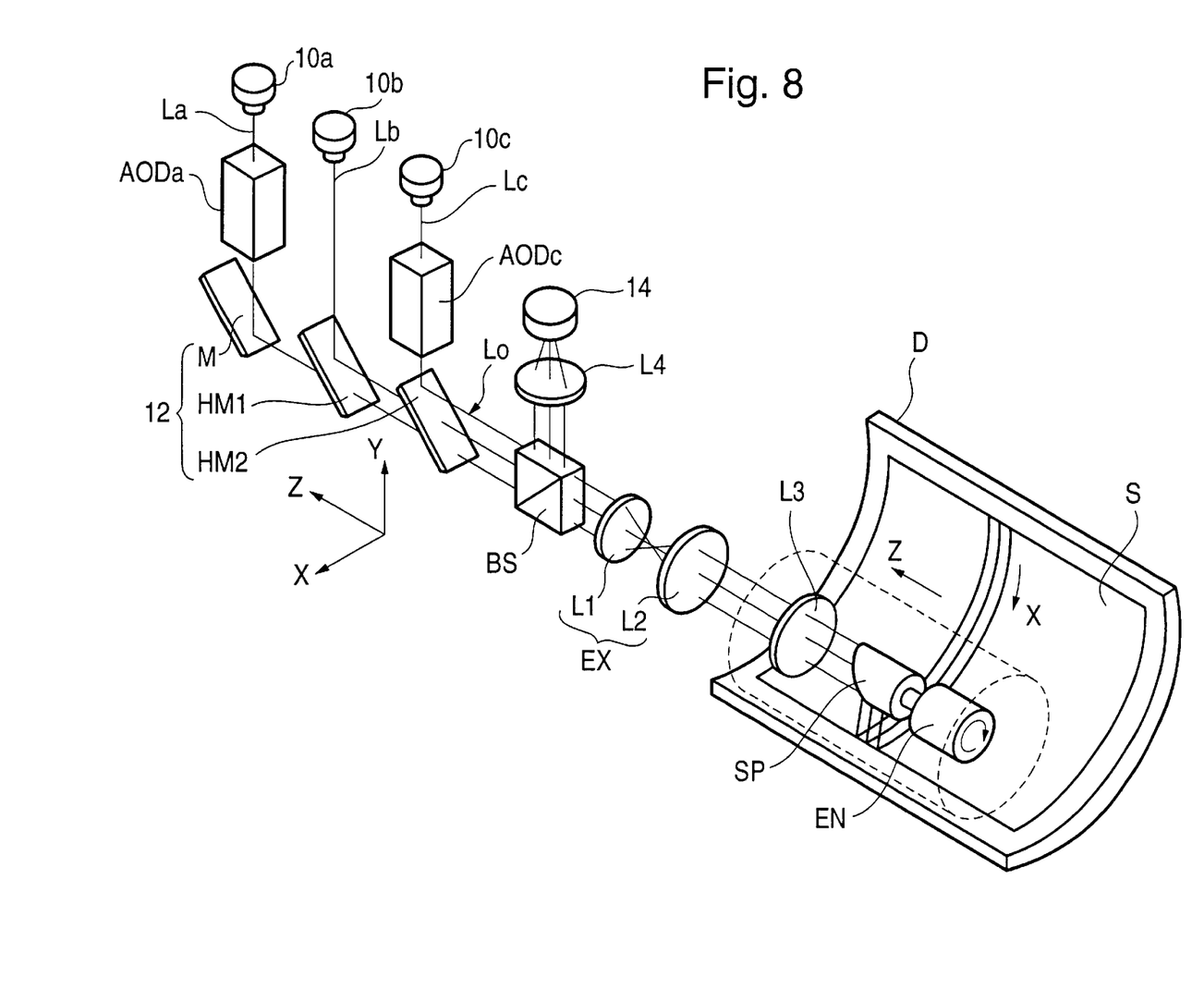
FIG. 8 is a conceptional diagram showing a light beam scanning apparatus of a drum inner surface scanning type according to a third embodiment of the present invention.

Referring to FIG. 8, there is shown a conceptional diagram of a light beam scanning apparatus according to a third embodiment. In this embodiment, one of three light beams $L_a$, $L_b$, and $L_c$, i.e., the light beam $L_b$ is set as a basic or reference beam, and only other light beams $L_a$ and $L_c$ are deflected by the optical deflecting devices $AOD_a$ and $AOD_c$. By adjusting the basic beam $L_b$ to be located on an optical axis of a scanning optical system, an optical deflecting device $AOD_b$ (see FIG. 1) is omitted for the basic beam $L_b$.

Furthermore, in this embodiment the beam splitter BS is disposed in the upstream of the beam expander EX, where the combined beam $L_0$ is split. The beam diameter of the combined beam $L_0$ is relatively small in the upstream of the beam expander EX, and therefore the beam splitter BS or the lens $L_4$ can be downsized. In FIG. 8, identical reference characters designate the same portions as those in FIGS. 1 and 7, and therefore their description is omitted here.

Although the above embodiments are described as those applied to an apparatus of a drum inner surface scanning type, the present invention is applicable to an apparatus such as that of a drum outer scanning type or of a planar scanning type, and includes these types of apparatuses. Optical deflecting devices are not limited to two-dimensional ones, but it is possible to use a combination of two one-dimensional optical deflecting devices crossing each other in their deflecting directions or one-dimensional ones. While the deflecting devices are preferably acousto-optic (AO) deflecting devices, it is possible to use other devices, for example, electro-optic (EO) devices, piezo mirrors, or galvano-mirrors.

As a light source for the light beams, preferably laser diodes are used, but it is also possible to use a combination of a light source such as a solid-state laser or a gas laser and a modulation device, for example, an acousto-optic device or an electro-optic device. While it is possible to store a difference between data of a beam position detected by a beam position detecting device and previously stored initialization data directly in the first memory area 44, beam position correction data including other elements substantially equivalent to this difference can also be stored in the first memory area and the present invention covers this case.

As described above, according to the present invention, beam position correction data for maintaining the constant positional relationship of a plurality of light beams are stored. The recording positions of respective light beams on an exposure plane are also detected to obtain a second or additional correction data for correcting deviations of the recording positions from the corresponding optimum recording position. The additional correction data is added to the beam position correction data to obtain the final correction data, by which the optical deflecting device is controlled. Accordingly, positional deviation of light beams caused by a temperature change or deterioration with age of an optical system prior to a scanning optical system can be corrected on the basis of the beam position correction data. In addition, the beam position correction data is corrected on the basis of the additional correction data. Therefore, an image quality is prevented from being lowered by unevenness of an optical power distribution within a light beam diameter or astigmatism of the scanning optical system.

The beam position detecting device can be arranged on a conjugate plane of a light beam exposure plane or in the vicinity thereof. The beam position correction data is stored in a first memory area, a plurality of data according to output resolutions is stored in additional correction data, and final correction data can be obtained by using the additional correction data corresponding to an output resolution selected out of the data. By detecting recording position differences of respective beams generated on the exposure plane when a plurality of beam positions are matched by using output data of beam position detecting devices, the additional correction data can be a sum of a compensation quantity for controlling the optical deflecting devices needed for compensating these differences and a correction quantity corresponding to output resolutions. The additional correction data can be obtained by measuring intervals of recording lines in which an image is actually recorded on an exposure plane with respective beams, when the respective deflecting devices is controlled by using the beam position correction data. The target additional correction data is a compensation quantity for controlling the deflecting device so that the measured intervals come to a constant value corresponding to the desired resolution of the image.

Additionally, according to the present invention, there is provided a light beam scanning apparatus directly applied to the present correcting method.

What is claimed is:

1. A method for correcting a recording position of a light beam recorded on an exposure plane by a light beam scanning apparatus, in which at least one light beam of a plurality of light beams is deflected by an optical deflecting device and said plurality of light beams including the deflected light beam are combined and scanned by a common scanning optical system to said exposure plane, comprising steps of:

(a) detecting respective positions of said plurality of light beams, before introducing said plurality of light beams into the scanning optical system, by using a beam position detecting device;

(b) determining a first correction data for optical deflecting devices for keeping said detected relative beam positions of the respective light beams constant and storing said first correction data;

(c) detecting the recording position of the light beam on said exposure plane to determine a deviation of the recording position from an optimum position, and obtaining a second correction data for correcting said deviation; and (d) adding said second correction data to said first correction data to obtain final correction data for driving said optical deflecting device;

wherein at least said step (c) is conducted before a scanning operation.

2. The method according to claim 1, wherein said beam position detecting device is arranged on a conjugate plane of said exposure plane or in the vicinity thereof.

3. The method according to claim 1, wherein said first correction data is stored in a first memory area and said second correction data is stored in a second memory area so as to have a plurality of types correspondingly to output resolutions on said exposure plane; and wherein said final correction data of the optical deflecting devices is obtained using said first correction data read out from said first memory area and said second correction data corresponding to one of output resolutions read out from said second memory area.

4. The method according to claim 1,
   wherein the optical deflecting device is controlled so that a reference light beam is sequentially matched with other light beams in their recording positions by using beam position detecting device data;
   wherein, after detecting a difference between the recording position of said other light beam and the recording position of said reference light beam on the exposure plane, a compensation quantity for controlling the optical deflecting devices to compensate these differences is determined; and
   wherein said second correction data is obtained by adding said compensation quantity to a deflection quantity of the corresponding to an output resolution.

5. The method according to claim 1, wherein the second correction data is set so that line interval comes to a constant value corresponding to a predetermined resolution after measuring the line intervals of a plurality of recorded lines formed by a plurality of light beams on the exposure plane.

6. A light beam scanning apparatus for scanning a plurality of combined light beams by using a common scanning optical system, comprising:
   an optical deflecting device for deflecting at least one of a plurality of light beams;
   a combining optical system for combining all the light beams including the deflected light beams;
   a scanning optical system for guiding the combined light beams to an exposure plane for scanning and recording an image;
   a beam splitter for splitting said combined light beams, the beam splitter being provided before said scanning optical system;
   a beam position detecting device for detecting beam positions of respective light beams in the split combined beams;
   a first processing means for comparing data of a plurality of beam positions detected by the beam position detecting device with previously stored initial data and calculating a difference between both data as a first correction data;
   a first memory area for storing said first correction data;
   a second memory area for storing a second correction data for use in correcting relative position differences of the recording positions detected on the basis of the recording positions of the respective light beams recorded on the light beam exposure plane, said second correction data being obtained and stored in the second memory area before a scanning operation;
   a second processing means for calculating final correction data for said optical deflecting device on the basis of said first correction data and said second correction data; and
   optical deflecting device control means for controlling a deflection caused by said optical deflecting device on the basis of the final correction data in synchronization with said scanning optical system.

7. The light beam scanning apparatus according to claim 6, wherein a reflecting mirror inserted in an optical path of the combined light beams is used instead of the beam splitter so that the combined light beams reflected on the reflecting mirror are guided to said beam position detecting device.

8. The light beam scanning apparatus according to claim 7, wherein said reflecting mirror is used also as a density filter for adjusting an intensity of a transmitted light beam.

9. The light beam scanning apparatus according to claim 6, further comprising a condenser lens for condensing the combined light beams split by the beam splitter to a beam position detecting device arranged on a conjugate plane of the exposure plane or in the vicinity thereof.

10. The light beam scanning apparatus according to claim 7, further comprising a condenser lens for condensing the combined light beams reflected on the reflecting mirror to the beam position detecting device arranged on a conjugate plane of the exposure plane or in the vicinity thereof.

11. The light beam scanning apparatus according to claim 6, wherein said beam position detecting device is a two-dimensional position sensor.

12. The light beam scanning apparatus according to claim 6, wherein said scanning optical system is of a drum inner surface scanning type.

13. The light beam scanning apparatus according to claim 6, wherein said light beams are laser beams emitted from laser diodes or solid-state lasers.

14. The light beam scanning apparatus according to claim 13, wherein said optical deflecting device is an acousto-optic deflecting device or an electro-optic device for two-dimensionally deflecting the light beam.

15. The light beam scanning apparatus according to claim 6, wherein said second correction data is of a plurality of types correspondingly to output resolutions on the exposure plane, and wherein the final correction data is obtained by using second correction data corresponding to selected one of the output resolutions.

16. The method of controlling a drive operation of a light beam scanning apparatus for deflecting at least one light beam of a plurality of light beams by using optical deflecting device, combining all the light beams, and scanning them on an exposure plane by using a common scanning optical system, comprising steps of:
   (a) detecting respective positions of said plurality of light beams by using a beam position detecting device before said plurality of light beams are introduced into the scanning optical system;
   (b) determining a first correction data for an optical deflecting device for keeping said detected relative positions of the respective light beams constant;
   (c) providing a second correction data for correcting the relative position differences of the recording positions of the light beams on the exposure plane, said second correction data being obtained by detecting a deviation of the recording position of the light beam on the exposure plane from an optimum position;
   (d) adding said second correction data to said first correction data to obtain final correction data; and
   (e) controlling a drive operation of said optical deflecting device on the basis of said final correction data;
   wherein at least said step (c) is conducted before a scanning operation and said step (e) is conducted in the scanning operation.

17. The method according to claim 1, further comprising automatically rewriting said first correction data at a predetermined time.

18. The light beam scanning apparatus according to claim 6, wherein the combining optical system comprises a total reflection mirror and a plurality of half mirrors.

19. The method according to claim 16, further comprising automatically rewriting said first correction data at a predetermined time.

20. The method of claim 1, wherein determining the first correction data comprises detecting a position of each respective light beam with positions detected before scanning.

21. The method of claim 16, wherein determining the first correction data comprises detecting a position of each respective light beam with positions detected before scanning.

22. The method of claim 1, wherein determining the first correction data comprises detecting relative position of the light beams with respect to another of the plurality of light beams to define a center of the light beams.

23. The method of claim 16, wherein determining the first correction data comprises detecting relative position of the light beams with respect to another of the plurality of light beams to define a center of the light beams.

* * * * *